United States Patent [19]

Wada et al.

[11] Patent Number: 5,414,627
[45] Date of Patent: May 9, 1995

[54] ELECTRIC POWER STEERING CONTROL DEVICE FOR AUTOMOTIVE VEHICLE

[75] Inventors: Shunichi Wada; Kazuhisa Nisino, both of Himeji; Yasushi Sasaki, Hamamatsu, all of Japan

[73] Assignees: Mitsubishi Denki Kabushiki Kaisha, Tokyo; Suzuki Motor Corporation, Hamamatsu, both of Japan

[21] Appl. No.: 103,914

[22] Filed: Aug. 10, 1993

[30] Foreign Application Priority Data

Aug. 17, 1992 [JP] Japan .................................. 4-217674

[51] Int. Cl.$^6$ ............................................. B62D 5/04
[52] U.S. Cl. .............................. 364/424.05; 180/79.1; 180/142
[58] Field of Search .................. 364/424.05; 180/79.1, 180/140, 141, 142; 280/91

[56] References Cited

U.S. PATENT DOCUMENTS

| | | | |
|---|---|---|---|
| 4,754,828 | 7/1988 | Morishita et al. | 180/79.1 |
| 4,828,060 | 5/1989 | Drutchas et al. | 180/142 |
| 4,893,688 | 1/1990 | Morishita | 180/79.1 |
| 4,895,216 | 1/1990 | Fusimi et al. | 180/79.1 |
| 4,972,320 | 11/1990 | Sugiura et al. | 364/424.05 |
| 5,097,420 | 3/1992 | Morishita | 364/424.05 |
| 5,156,227 | 10/1992 | Taniguchi et al. | 180/142 |
| 5,299,650 | 4/1994 | Wada et al. | 364/424.05 |

Primary Examiner—Gary Chin
Attorney, Agent, or Firm—Sughrue, Mion, Zinn, Macpeak and Seas

[57] ABSTRACT

An electric power steering control device includes a motor controller for controlling an electric motor providing the assisting steering torque; and a clutch controller for controlling an electromagnetic clutch selectively connecting the assisting steering torque of the motor to the steering system. The degree of engagement (connection) of the clutch corresponds to the clutch current command level $I_C$. When the vehicle speed is above a predetermined speed $V_0$ (i.e., during high speed driving), the clutch current $I_C$ is set at a predetermined half current level $I_{CR}$. During low vehicle speeds below $V_0$, the clutch current $I_C$ is gradually decreased to the half current level $I_{CR}$ as the vehicle speed increases to $V_0$. When the steering torque T is above a first predetermined level T1 indicative of an abnormality during high speed operation, the clutch current $I_C$ is set at a minimal level $I_{CO}$. The steering torque T is returned to the half current level $I_{CR}$ when it is below a second predetermined level T2 smaller than the first level T1, thereby avoiding steering torque hunting.

5 Claims, 7 Drawing Sheets

ELECTRIC POWER STEERING CONTROL DEVICE FOR AUTOMOTIVE VEHICLE

BACKGROUND OF THE INVENTION

This invention relates to electric power steering devices for automotive vehicles including an electric motor for providing a steering torque to assist the driver in directing the road wheels of the vehicle.

FIG. 7 is a diagram showing the overall structure of a typical electric power steering device for an automotive vehicle, as disclosed, for example, in Japanese Kokai Nos. 62-255273 and 63-215461. The driver of the vehicle applies steering torque to a steering wheel 1. A steering shaft 2 transmits the torque from the steering wheel 1. A steering torque sensor 3 provided on the steering shaft 2 detects the steering torque T applied to the steering wheel 1. Universal joints 4 connect the angled parts of the steering shaft 2. A pinion 5 at the bottom end of the steering shaft 2 is engaged with a rack 6 for directing the road wheels of the vehicle. A steering speed sensor 7 detects the steering speed A of the steering wheel 1.

A control unit 9 including a microcomputer generates motor current command level $_M$ and clutch control signal C in response to the vehicle speed V detected by a vehicle speed sensor 10, steering speed A, and steering torque T. The electric power is provided by a battery 11 mounted on the vehicle. A key switch 12 is inserted between the battery 11 and the control unit 9. An electric motor 13 for providing the assisting steering torque is driven by the DC current supplied from the battery 11, in accordance with the motor current command level $I_M$.

An electromagnetic clutch 14 directly coupled to the output shaft of the electric motor 13 is engaged and disengaged in response to the clutch control signal C. A worm 15 coupled to the output shaft of the electromagnetic clutch 14 is engaged with a worm wheel 16. A pinion 18 coupled to the worm wheel 16 is engaged with the rack 6. Thus, in response to the clutch control signal C, the assisting steering torque provided by the electric motor 13 is selectively transmitted to the rack 6 for directing the road wheels.

FIG. 8 is a block diagram showing the conventional structure of the control unit of the electric power steering device. The control unit 9 includes a motor controller 91, a clutch controller 92 and a motor current detector 93. The motor controller 91 calculates the motor current command level $I_M$ on the basis of the steering torque T and the vehicle speed V, and drives the electric motor 13 in accordance with the motor current command level $I_M$. The clutch controller 92 generates the clutch control signal C in response to the vehicle speed V, etc., and outputs it to the electromagnetic clutch 14. When the vehicle speed V reaches a predetermined level (e.g., 50 km/h) corresponding to a high vehicle speed condition, the clutch controller 92 switches the clutch control signal C from ON to OFF. The motor current detector 93 consisting of a grounded resistor detects the actual motor current level $I_M$ and inputs it to the motor controller 91.

In response to the actual motor current level $I_M$, the motor controller 91 performs the feedback control of voltage supplied to the electric motor 13, such that the actual motor current level $I_M$ flowing through the electric motor 13 agrees with the motor current command level $I_M$. The clutch controller 92 switches the clutch control signal C to the OFF state under a high vehicle speed condition, or when a system failure is detected on the basis of the signals from various sensors during a low vehicle speed.

FIG. 9a shows the ON/OFF state of the clutch control signal C relative to the vehicle speed V. When the vehicle speed V is below the predetermined vehicle speed $V_0$, the clutch control signal C is ON, wherein the clutch current of the electromagnetic clutch 14 is about 1 A and the electromagnetic clutch 14 transmits the assisting steering torque of the electric motor 13 to the steering system. When the vehicle speed V is above the predetermined vehicle speed $V_0$, the clutch control signal C is OFF, wherein the clutch current is zero and the electromagnetic clutch 14 is disengaged.

FIG. 9b shows the variation of the motor current command level $I_M$ relative to the vehicle speed V (plotted along the abscissa) and the steering torque T (the increasing direction is shown by the arrow). The level of the motor current command level $I_M$ depends upon both the vehicle speed V and the steering torque T. The three curves in FIG. 9b corresponds to three distinct values of the steering torque T increasing in the direction of the arrow. When the vehicle speed V is above the predetermined vehicle speed $V_0$, the motor current command level $I_M$ is zero for all values of the steering torque T. When the vehicle speed V is below the predetermined vehicle speed $V_0$, the motor current command level $I_M$ becomes the greater as the vehicle speed V decreases and as the steering torque T increases. Usually, the steering torque required to turn the road wheels of the vehicle is greater when the speed of the vehicle is smaller. Thus, the motor current command level $I_M$ is increased as the vehicle speed V decreases, to provide a greater assisting torque.

Next, the operation of the conventional electric power steering control device of FIGS. 7 and 8 is described by referring to FIGS. 9a and 9b.

During the low vehicle speed condition where the vehicle speed V is below the predetermined vehicle speed $V_0$, the clutch controller 92 of the control unit 9 turns on the clutch control signal C to engage the electromagnetic clutch 14 such that the torque of the electric motor 13 is transmitted to the steering system. Further, the motor controller 91 generates the motor current command level $I_M$ on the basis of the vehicle speed V from the vehicle speed sensor 10 and the steering torque T from the steering torque sensor 3, and drives the electric motor 13 to generate a necessary assisting steering torque.

The required steering torque becomes greater as the vehicle speed V becomes smaller. Thus, the motor current command level $I_M$ increases as the vehicle speed decreases. Further, if a greater steering torque is necessary due to the road surface condition, etc., the motor current command level is adjusted accordingly to provide the required assisting steering torque. The steering torque which the driver of the vehicle is required to provide is thus maintained substantially constant.

When a system failure is detected during a low vehicle speed condition, the clutch control signal C is turned off to disengage the electromagnetic clutch 14. The electric motor 13 is thus disconnected from the steering system to ensure safety. For example, when the motor current command level $I_M$ or the actual motor current level $I_M$ exhibits an abnormality, or when the steering wheel 1 is not operated for a prolonged period, an occurrence of a system failure is inferred, and the clutch control signal C is turned off even under a low vehicle speed condition.

On the other hand, during a high vehicle speed condition where the vehicle speed V is above the predetermined vehicle speed $V_0$, the motor controller 91 reduces the motor current command level $I_M$ to zero, and the clutch controller 92 turns off the clutch control signal C to disengage the electromagnetic clutch 14 and to disconnect the electric motor 13 from the steering system. Under this condition, the electric motor 13 is not driven since no voltage is supplied thereto. Further, the steering operation is not disturbed by an occurrence of a system failure since the electromagnetic clutch 14 is disengaged. When the vehicle speed V falls below the predetermined vehicle speed $V_0$, the clutch control signal C is again turned on to engage the electromagnetic clutch 14, and the motor current command level $I_M$ is generated in accordance with the vehicle speed V and the steering torque T.

Generally, when the control unit 9 fails, an unnecessary motor current command level $I_M$ is generated to drive the electric motor 13 erroneously. The steering wheel 1 is thus turned against the intention of the driver. On the other hand, when the electric motor 13 fails mechanically, the steering wheel 1 becomes incapable of rotation and the driver loses control of the vehicle. The dangers resulting from these failures may be avoided by the driver of the vehicle during a low vehicle speed condition. However, when the vehicle speed is high, these failures present extreme dangers upon the safety of the driver. Thus, the clutch control signal C is turned off to provide a fail-safe measure under a high vehicle speed condition where the vehicle speed V exceeds the predetermined vehicle speed $V_0$.

Thus the above conventional electric power steering control device has the following disadvantage. Namely, during a low vehicle speed condition ($V < V_0$), the electromagnetic clutch 14 is always turned on, provided that no system failure occurs. On the other hand, during a high vehicle speed condition ($V \geq V_0$), the electromagnetic clutch 14 is always turned off irrespective of an occurrence of a system failure. Thus, each time the vehicle speed V varies across the predetermined critical vehicle speed $V_0$, the electromagnetic clutch 14 is turned on and off, thereby generating a large operation noise. The driving comfort is thus reduced. In addition, the repeated ON/OFF operation of the electromagnetic clutch 14 reduces the life thereof. Furthermore, the ON/OFF operation of the electromagnetic clutch 14 gives the driver a certain shock through the steering wheel 1.

SUMMARY OF THE INVENTION

It is therefore an object of this invention to provide a reliable electric power steering control device by which the repeated ON/OFF operations of the electromagnetic clutch are effectively suppressed such that the noise generated by such operations is suppressed to improve the driving comfort of the driver and to prolong the life of the electromagnetic clutch.

The above object is accomplished in accordance with the principle of this invention by an electric power steering device for an automotive vehicle which comprises a steering system including a steering wheel; electric motor means for providing an assisting steering torque to the steering system; electromagnetic clutch means for selectively transmitting the assisting steering torque generated by the electric motor to the steering system; steering torque sensor means for detecting a steering torque applied upon the steering system; vehicle speed sensor means for detecting a speed of the vehicle; motor controller means, coupled to the steering torque sensor means and the vehicle speed sensor means, for generating a motor drive command level in accordance with the steering torque detected by the steering torque sensor means and the vehicle speed detected by the vehicle speed sensor means, the motor drive command level corresponding to a command level of the assisting steering torque generated by the electric motor means, wherein the motor controller means reduces the motor drive command level to zero when the vehicle speed is above a predetermined vehicle speed; clutch controller means, coupled to the steering torque sensor means and the vehicle speed sensor means, for generating a clutch drive command level in accordance with the steering torque detected by the steering torque sensor means and the vehicle speed detected by the vehicle speed sensor means, the clutch drive command level corresponding to a degree of engagement of the electromagnetic clutch means by which the assisting steering torque of the electric motor means is transmitted to the steering system, wherein the clutch controller means includes: (a) means for setting a first predetermined torque level for determining an occurrence of an abnormal level of the steering torque, and a second predetermined torque level smaller than the first torque level; (b) means for setting the clutch drive command level to a level corresponding to the vehicle speed detected by the vehicle speed sensor means when the vehicle speed detected by the vehicle speed sensor means is below a predetermined vehicle speed; (c) means for setting the clutch drive command level to a predetermined level when the vehicle speed detected by the vehicle speed sensor means is above a predetermined vehicle speed and the steering torque detected by the steering torque sensor means is below the first predetermined torque level; (d) means for setting the clutch drive command level to a predetermined minimal level smaller than the predetermined level set by the means (c), when the vehicle speed detected by the vehicle speed sensor means is above the predetermined vehicle speed and the steering torque detected by the steering torque sensor means rises above the first predetermined torque level; and (e) means for returning the clutch drive command level to the predetermined level set by the means (c), when the steering torque detected by the steering torque sensor means falls below the second predetermined torque level.

Preferably, the means (b) of the clutch controller means decreases the clutch drive command level gradually to the level of the clutch drive command level set by the means (c), as the vehicle speed increases to the predetermined vehicle speed. The motor drive command level may be a motor current command level of the electric motor means, and the clutch drive command level is a clutch current command level of the electromagnetic clutch means.

Alternatively, the above object is solved by a method for controlling an electric power steering system of an automotive vehicle including: a steering system including a steering wheel for receiving a steering torque applied by a driver; an electric motor for providing an assisting steering torque to the steering system; an electromagnetic clutch for transmitting the assisting steering torque of the electric motor to the steering system, wherein an amount of torque transmitted through the electromagnetic clutch corresponds to a clutch drive command level supplied thereto; wherein the method comprises the steps of: (a) judging whether or not a speed of the vehicle is above a predetermined vehicle speed; (b) setting the clutch drive command level of the electromagnetic clutch to a predetermined level when the vehicle speed is below a predetermined vehicle speed; (c) judging whether or not a steering torque applied upon the steering system is above a first predetermined torque level indicating an occurrence of an abnormal torque level when the vehicle speed is above the predetermined vehicle speed; (d) judging, when the steering torque is below the first torque level, whether or not the steering torque is below a second predetermined torque level smaller than the first predetermined torque level; (e) setting the clutch drive command level to a predetermined command level smaller than the first level set at step (b), when the steering torque is below the predetermined second torque level; and (f) setting the clutch drive command level to a predetermined minimal command level smaller than the predetermined command level set at step (e), when the steering torque is above the predetermined first torque level.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
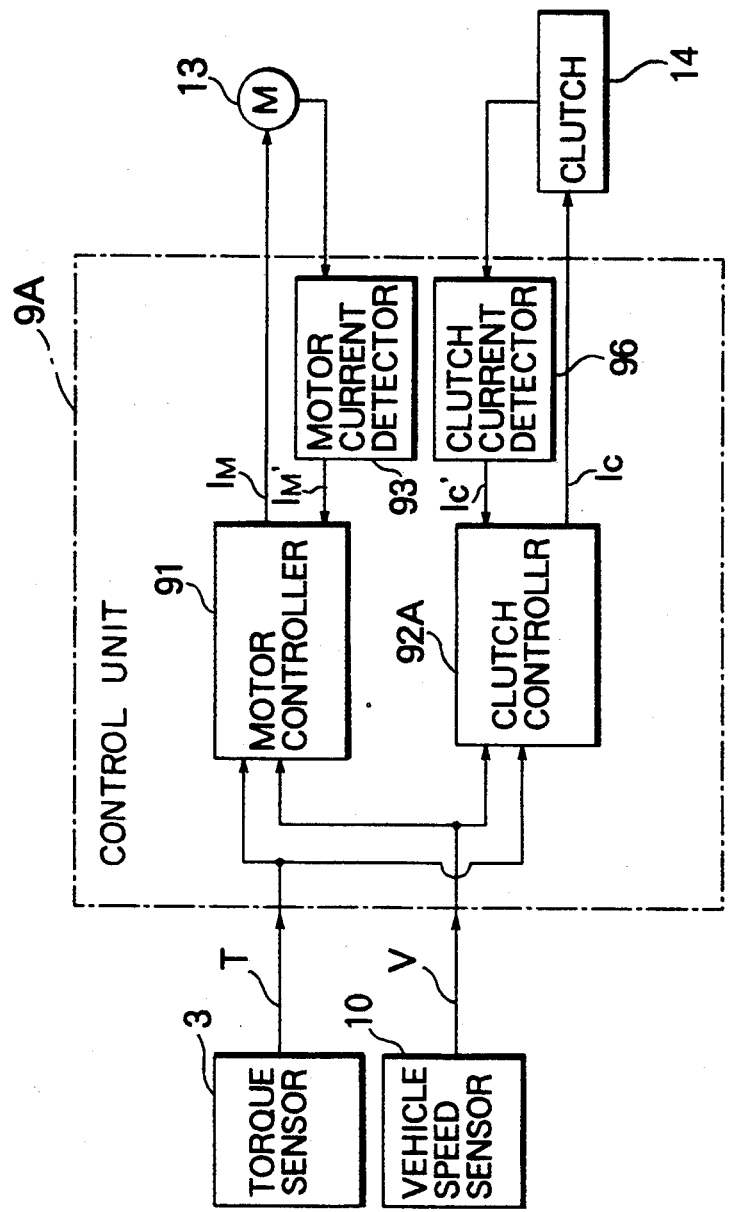
FIG. 1 is a block diagram showing the structure of the control unit according to this invention.
Figure 7:
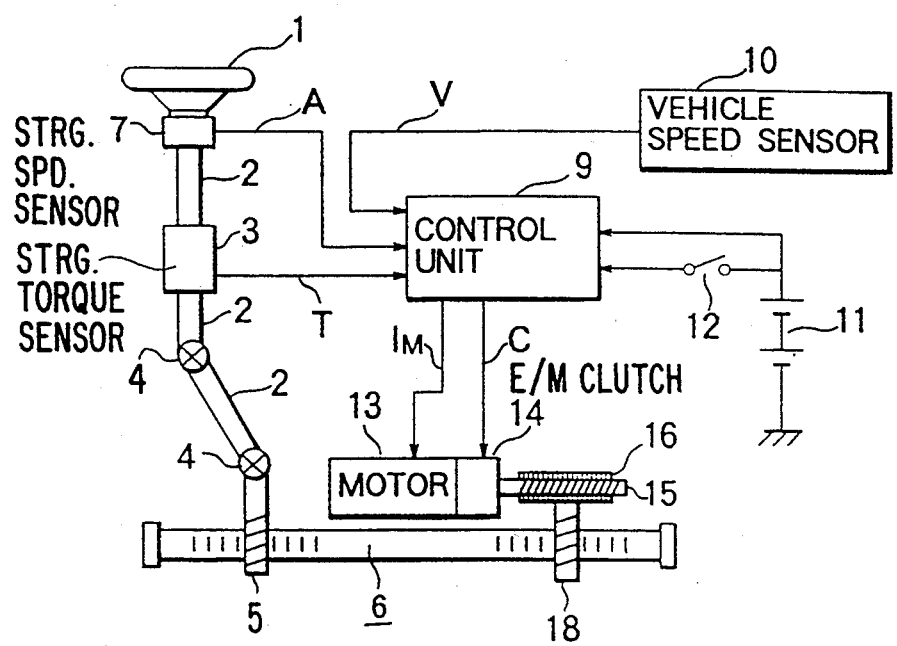
FIG. 7 is a diagram showing the overall structure of a typical electric power steering device for an automotive vehicle.
Figure 8:
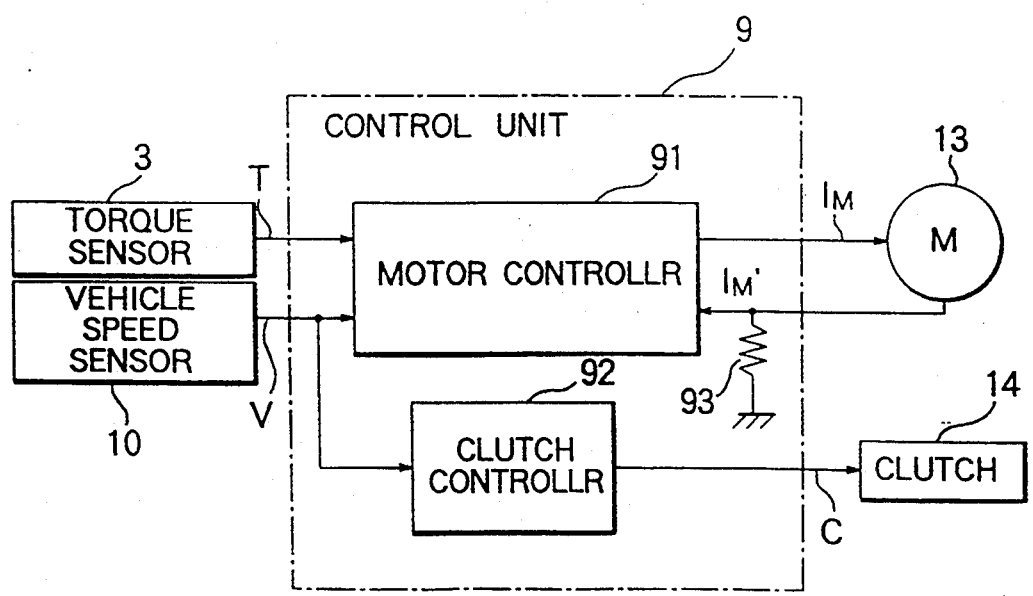
FIG. 8 is a block diagram showing the conventional structure of the control unit of the electric power steering device.

FIG. 1 is a block diagram showing the structure of the control unit according to this invention. The overall structure of the electric power steering device is as described above by reference to FIG. 7. The steering torque sensor 3 detects and outputs the steering torque $T_1$ and the vehicle speed sensor 10 detects and outputs the vehicle speed V. The control unit 9A includes a motor controller 91, a clutch controller 92A, a motor current detector 93 and a clutch current detector 96. On the basis of the steering torque T and the vehicle speed V, the motor controller 91 generates the motor current command level $I_M$. The motor current detector 93, consisting, for example, of a grounded resistor, detects the actual motor current level $I_{M'}$ flowing through the electric motor 13 for providing the assisting steering torque. In response to the actual motor current level $I_{M'}$, the motor controller 91 performs the feedback control of the current supplied to the electric motor 13 such that the actual motor current level $I_{M'}$ is adjusted to the motor current command level $I_{M'}$. On the basis of the steering torque T and the vehicle speed V, the clutch controller 92A generates the clutch current command level $I_C$. The clutch current detector 96 detects the actual clutch current level $I_{C'}$ flowing through the electromagnetic clutch 14 and inputs it to the clutch controller 92A. In response to the actual clutch current level $I_{C'}$, the clutch controller 92A performs the feedback control of the current supplied to the electromagnetic clutch 14 such that the actual clutch current level $I_{C'}$ is adjusted to the clutch current command level $I_C$.

Figure 5:
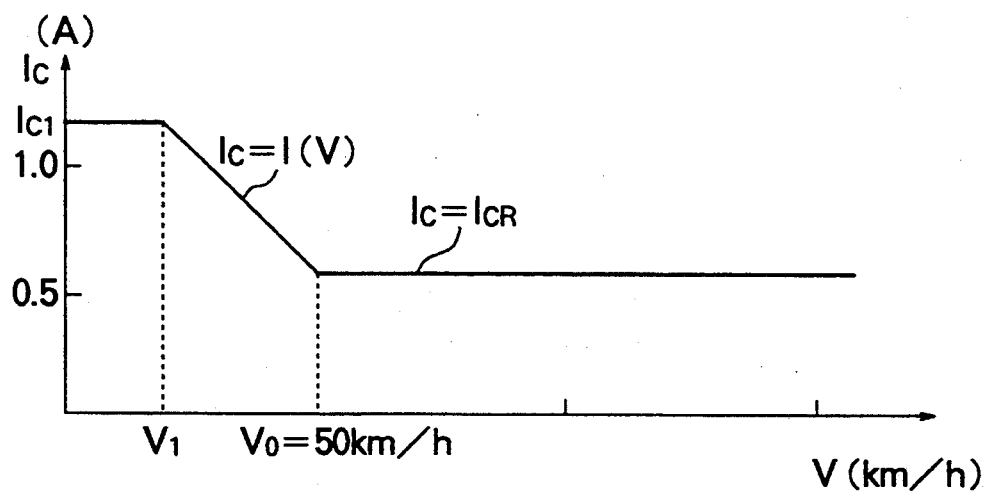
FIG. 5 is a diagram showing the normal variation pattern of the clutch current command level $I_C$ with respect to the vehicle speed V plotted along the abscissa.
Figure 9A:
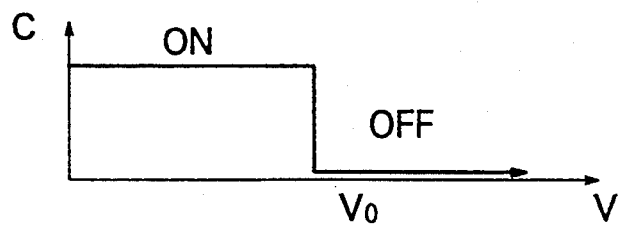
FIG. 9a shows the ON/OFF state of the clutch control signal C relative to the vehicle speed V.
Figure 9B:
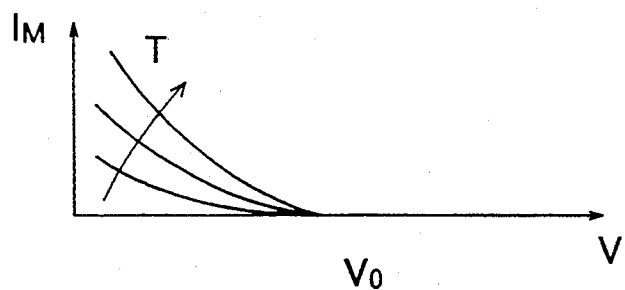
FIG. 9b shows the variation of the motor current command level $I_M$ relative to the vehicle speed V (plotted along the abscissa) and the steering torque T (the increasing direction is shown by the arrow).

FIG. 5 is a diagram showing the normal variation pattern of the clutch current command level $I_C$ with respect to the vehicle speed V plotted along the abscissa. Below a vehicle speed $V_1$, the clutch current command level $I_C$ is at a first constant clutch current level $I_{Cl}$ which may be about 1.2 A. When the clutch current command level $I_C$ is at the clutch current level $I_{Cl}$, the electromagnetic clutch 14 is fully engaged and is capable of transmitting the maximum torque that is generated by the electric motor 13. Between the vehicle speed $V_1$ and vehicle speed $V_0$ (=50 km/h), the clutch current command level $I_C$ decreases linearly from the full clutch current level $I_{Cl}$ to a predetermined half clutch current level $I_{CR}$, which may be about 0.5 A. As the vehicle speed V increases toward the vehicle speed $V_0$, the motor current command level $I_M$ decreases (see FIG. 9b) to reduce the torque which is generated by the electric motor 13 and is transmitted through the electromagnetic clutch 14. Thus, the clutch current command level $I_C$ is decreased when the vehicle speed V is between the vehicle speed $V_1$ and vehicle speed $V_0$. The dependence of the clutch current command level $I_C$ upon the vehicle speed V below the vehicle speed $V_0$ is represented by a function I(V). Above the vehicle speed $V_0$, the clutch current command level $I_C$ is maintained at the half clutch current level $I_{CR}$ at which the electromagnetic clutch 14 is in the half-engagement state.

Figure 6:
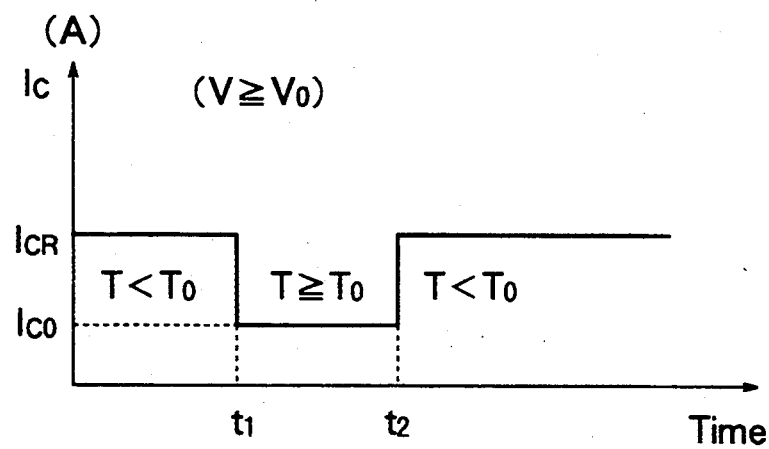
FIG. 6 is a diagram showing the variation of the clutch current command level $I_C$ with respect to time under the high vehicle speed condition ($V \geq V_0$) wherein a temporary steering torque abnormality ($T \geq T_0$) occurs.

FIG. 6 is a diagram showing the variation of the clutch current command level $I_C$ with respect to time under the high vehicle speed condition ($V \geq V_0$)

wherein a temporary steering torque abnormality ($T \geq T_0$) occurs. As discussed above, the clutch current command level $I_C$ is normally maintained at the constant half clutch current level $I_{CR}$ when the vehicle speed V is above the vehicle speed $V_0$ (i.e., when $V \geq V_0$). However, when the steering torque T detected by the steering torque sensor 3 rises above a predetermined steering torque $T_0$ (i.e., if $T \geq T_0$), as is the case between time points $t_1$ and $t_2$ in FIG. 6, the clutch current command level $I_C$ is further reduced to a minimal clutch current level $I_{CO}$, which may be about 0.2 A. The predetermined steering torque $T_0$ is, for example, 7N.m. When the clutch current command level $I_C$ is at the minimal clutch current level $I_{CO}$, the electromagnetic clutch 14 is in a complete half-clutch state (a half-engagement state in which the electric motor 13 may be driven without rotating the output shaft of the electromagnetic clutch 14).

Figure 2:
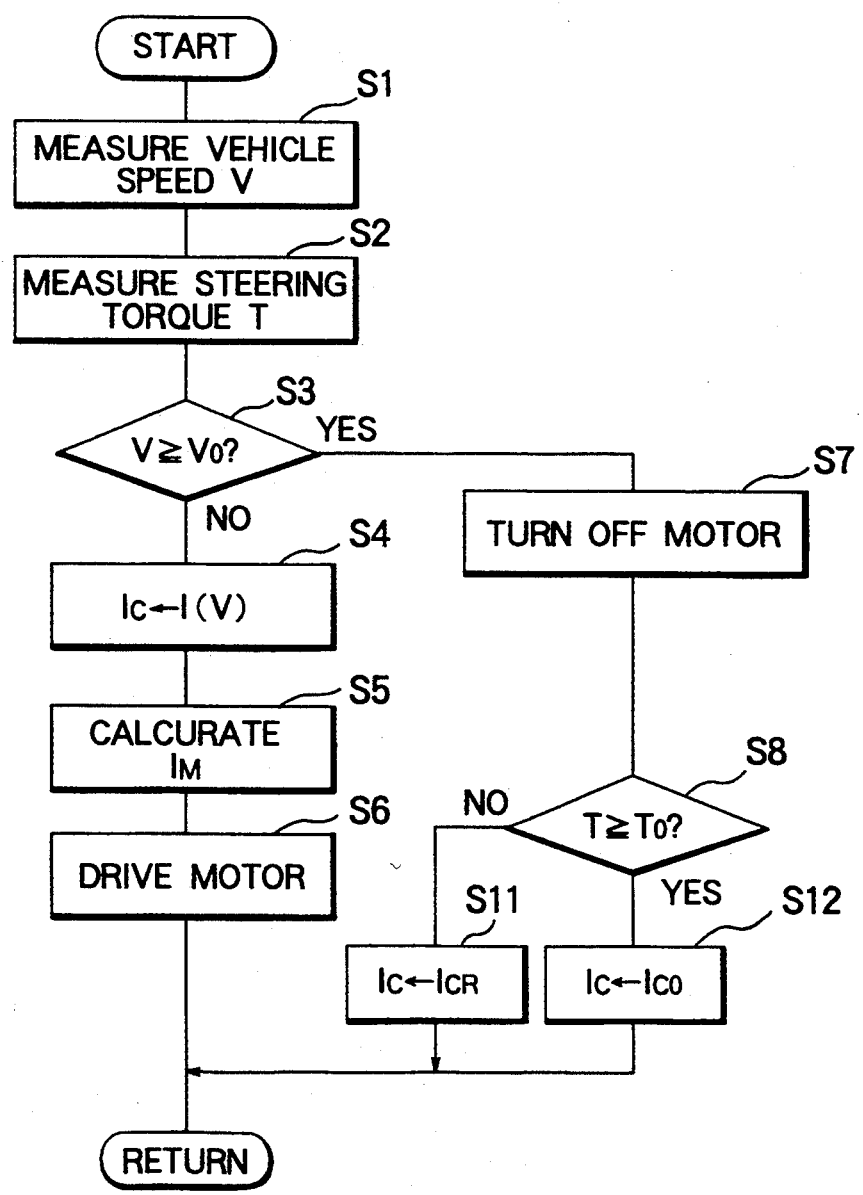
FIG. 2 is a flowchart showing the routine followed by the control unit 9A of FIG. 1 for controlling the electric motor and the electromagnetic clutch.

FIG. 2 is a flowchart showing the routine followed by the control unit 9A of FIG. 1 for controlling the electric motor and the electromagnetic clutch. At step S1, the vehicle speed V is measured on the basis of the output signal from the vehicle speed sensor 10. At step S2, the steering torque T is measured on the basis of the output signal from the steering torque sensor 3. At step S3, it is judged whether or not the vehicle speed V detected at step S1 is above the predetermined vehicle speed $V_0$ (i.e., whether $V \geq V_0$). The affirmative judgment indicates that the vehicle is in the high speed condition. If the judgment is negative at step S3 (i.e., the vehicle is in the low speed condition), the execution proceeds to step S4, where the clutch current command level $I_C$ is set at the value of the function I(V) (see FIG. 5). The value of clutch current command level $I_C$ thus is set at a value which increases as the vehicle speed decreases from $V_0$ to $V_1$. Below the vehicle speed $V_1$, the clutch current command level $I_C$ is set at the full clutch current level $I_C$. Further, at step S5, the motor current command level $I_M$ is calculated. The value of the motor current command level $I_M$ depends on the vehicle speed V and the steering torque T as described above by reference to FIG. 9b. At step S6, the current supplied to the electric motor 13 is controlled such that the actual motor current level $I_M$ is adjusted to the motor current command level $I_M$. Thereafter, the execution returns to the start, to repeat the routine of FIG. 2.

On the other hand, if the judgment is affirmative at step S3, the execution proceeds to step S7, where the motor current command level $I_M$ is set at zero and the electric motor 3 is thereby turned off. Next, at step S8, it is judged whether or not the steering torque T is above the predetermined steering torque $T_0$ (i.e., whether $T \geq T_0$). The affirmative judgment at step S8 indicates a potential occurrence of an abnormality of the steering system. If the judgment is negative at step S8, the execution proceeds to step S11, where the clutch current command level $I_C$ is set at the half clutch current level $I_{CR}$. Since the clutch current command level $I_C$ is decreased as a function I(V) of the vehicle speed V as the vehicle speed V increases from $V_1$ to $V_0$ (see FIG. 5), the level of the clutch current command level $I_C$ varies smoothly when the vehicle speed V varies across the vehicle speed $V_0$. The degree of engagement of the electromagnetic clutch 14 thus also varies smoothly when the vehicle speed V varies across the vehicle speed $V_0$, and no shock is experienced by the driver of the vehicle. By the way, the degree of engagement of the electromagnetic clutch 14 responds to the clutch current command level $I_C$ with a hysteresis. When the clutch current command level $I_C$ is maintained at a constant half-clutch level while the electric motor 13 is turned off, the electromagnetic clutch 14 may undergo from the half-engagement state (half-clutch) to a totally disengaged state (clutch-off). However, if the half clutch current level $I_{CR}$ is set at about 0.5 A as described above, the half-clutch state in a relatively strong engagement degree (coupling power) can be maintained. After step S11, the execution returns to the start to repeat the routine.

On the other hand, if the judgment is affirmative at step S8, the execution proceeds to step S12, where the clutch current command level $I_C$ is reduced to the minimal clutch current level $I_{CO}$. The affirmative judgment at step S8 may indicate that the steering torque T above the predetermined level $T_0$ is generated by the operation of the driver, etc., during the high vehicle speed condition. Thus, to provide a fail-safe measure against the locking failure of the electric motor 13, etc., the clutch current command level $I_C$ is reduced to the minimal clutch current level $I_{CO}$, such that the degree of engagement of the electromagnetic clutch 14 is further reduced to place it in a complete half-clutch state. The steering torque T above the predetermined level $T_0$ may also be detected by the steering torque sensor 3 when an abnormal torque is generated by the electric motor 13 during the high vehicle speed condition. The clutch current command level $I_C$ is also reduced to the minimal clutch current level $I_{CO}$ in such case. Thus, although the electromagnetic clutch 14 is not completely disengaged, the adverse effects of the abnormal torque upon the steering system are effectively prevented.

The clutch current command level $I_C$ may be set at the minimal clutch current level $I_{CO}$ during the high vehicle speed condition irrespective of whether the steering torque T above $T_0$ is detected or not. However, the electromagnetic clutch 14 may fall into the totally disengaged state (clutch-off state), if the clutch current command level $I_C$ is set at the minimal clutch current level $I_{CO}$ for a prolonged period. Then, the electromagnetic clutch 14 is turned on (switched from the OFF to the ON state), when the vehicle returns to the low speed condition. This may generate switching noise, etc., as discussed above. Thus, according to this invention, the clutch current command level $I_C$ is set at the minimal clutch current level $I_{CO}$ only when the steering torque T above the predetermined level $T_0$ is detected. As a result, the electromagnetic clutch 14 remains in the ON state (half-clutch state) during the high vehicle speed condition, and no switching operation from the ON to the OFF or from the OFF to the ON state takes place when the vehicle speed V varies across the predetermined vehicle speed $V_0$.

Thus, according to this invention, the assisting steering torque is provided by the electric motor 13 during the low vehicle speed condition, and during the high vehicle speed condition where the abnormal torque of the electric motor 13 may present a grave danger upon the driver, the safety is ensured by setting the clutch current command level $I_C$ at minimal clutch current level $I_{CO}$ if the steering torque T above the predetermined level $T_0$ is detected. The danger presented by the steering inability caused, for example, by the adhesion or the increase in the rotational viscous resistance between the parts of the steering system, can also be avoided.

Namely, according to the routine of FIG. 2, the clutch current command level $I_C$ is reduced to the half clutch current level $I_{CR}$ when the vehicle speed V rises above the predetermined vehicle speed $V_0$, such that the electromagnetic clutch 14 slips and the torque transmitted therethrough is reduced. The disadvantage resulting from the ON/OFF operations of the electromagnetic clutch 14 which takes place when the vehicle speed varies across the predetermined vehicle speed $V_0$ is thus eliminated. Further, when the road wheels of the vehicle are automatically turned against the intention of the driver due to an occurrence of a system failure, or when the control of the vehicle is lost due to the failure of the electric motor, the clutch current command level $I_C$ is reduced to the minimal clutch current level $I_{CO}$ such that the driver can regain the steering control of the vehicle at the emergency. According to the above embodiment, during the low vehicle speed condition, the clutch current command level $I_C$ is set as a function $I(V)$ of the vehicle speed V. However, the clutch current command level $I_C$ may be set at a constant level of about 1 A over the whole vehicle speed range below the predetermined vehicle speed $V_0$.

Even if the control unit 9A is normal and the motor current command level $I_M$ is set at zero when the vehicle speed V is above the predetermined level $V_0$, a torque is developed briefly, which is a sum (resultant) of the self-aligning torque (i.e., the torque resulting from the force by which the vehicle tends to return to the directly forward central direction) and the rotational inertia of the electric motor 13 and the steering wheel 1. Thus, for the purpose of preventing judgment errors, the predetermined steering torque $T_0$ for determining an occurrence of abnormality is set at a relative large value of about 7N.m.

Further, the routine of FIG. 2 may have the following disadvantage. Namely, assume that the steering torque T increases above the predetermined level $T_0$ due to the failure of the motor controller 91 or the electric motor 13. Then, the clutch current command level $I_C$ is reduced to the minimal clutch current level $I_{CO}$ and the torque transmitted through the electromagnetic clutch 14 is reduced, thereby reducing the steering torque T detected by the steering torque sensor 3. When the steering torque T is thus reduced below the predetermined level $T_0$, the clutch current command level $I_C$ is increased to the half clutch current level $I_{CR}$, thereby increasing the torque transmitted through the electromagnetic clutch 14. Thus, the steering torque T again rises above the predetermined level $T_0$. The hunting of the steering torque T is may thus be generated, and the steering torque T, which should be retained below the predetermined level $T_0$, rises repeatedly thereabove.

Figure 3:
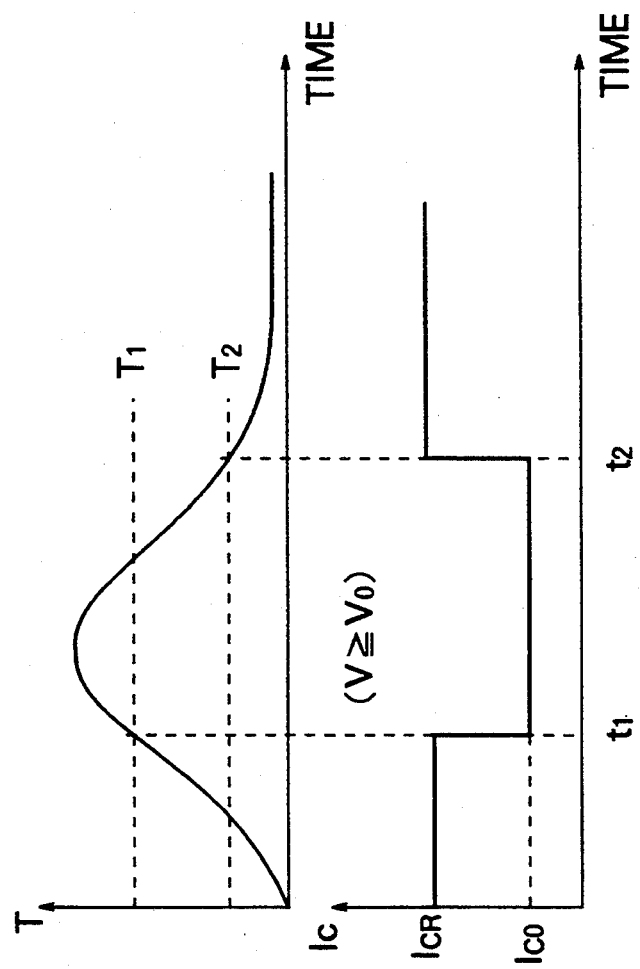
FIG. 3 is a time chart showing the relationship between the variation of the steering torque T (the top curve) and the clutch current command level $I_C$ (the bottom curve) according to an improved control method by which the hunting of the steering torque T is prevented.

FIG. 3 is a time chart showing the relationship between the variation of the steering torque T (the top curve) and the clutch current command level $I_C$ (the bottom curve) according to an improved control method by which the hunting of the steering torque T is prevented. According to the improved control routine, the clutch controller 92A includes means for setting a first predetermined steering torque $T_1$ and a second steering torque $T_2$ smaller than the first torque $T_1$. When the steering torque T rises above the steering torque $T_1$ (at time point $t_1$ in FIG. 3) corresponding to the predetermined steering torque $T_0$ of the routine of FIG. 2 during the high vehicle speed condition (i.e., when $V \geq V_0$), the clutch current command level $I_C$ is reduced from the half clutch current level $I_{CR}$ to the minimal clutch current level $I_{CO}$. The clutch current command level $I_C$ is returned to the half clutch current level $I_{CR}$ when the steering torque T falls below the second predetermined steering torque $T_2$ (at time point $t_2$ in FIG. 3).

Figure 4:
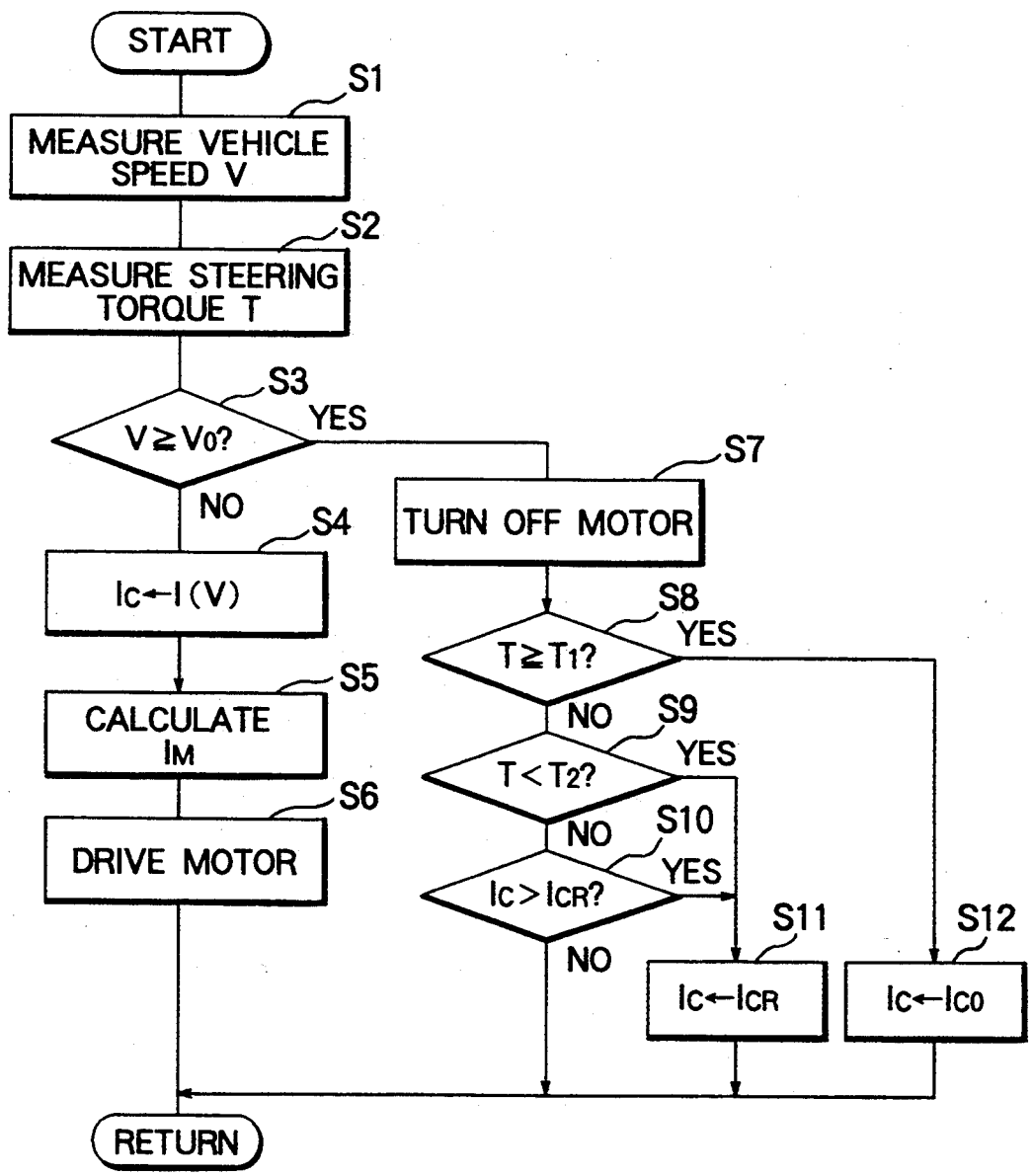
FIG. 4 is a flowchart showing the improved routine followed by the control unit 9A of FIG. 1, by which the hunting of the steering torque T is prevented according to this invention.

FIG. 4 is a flowchart showing the improved routine followed by the control unit 9A of FIG. 1, by which the hunting of the steering torque T is prevented according to this invention. The steps S1 through S8 and the steps S11 and S12 are the same as the corresponding steps of FIG. 2.

Thus, at step S8, it is judged whether or not the steering torque T is above the first predetermined steering torque $T_1$ (i.e., whether $T \geq T_1$ holds). If the judgment is negative at step S8 (i.e., if $T < T_1$), the execution proceeds to step S9, where it is judged whether or not the steering torque T is below the second predetermined steering torque $T_2$ (i.e., whether $T < T_2$ holds). If the judgment is negative at step S9, the execution proceeds to step S10, where it is judged whether or not the clutch current command level $I_C$ is above the half clutch current level $I_{CR}$ (i.e., whether $I_C > I_{CR}$). On the other hand, if the judgment is affirmative at step S8, the execution proceeds to step S12, where the clutch current command level $I_C$ is set at the minimal clutch current level $I_{CO}$. If the judgment is affirmative at step S9 or step S10, the execution proceeds to step S11, where the clutch current command level $I_C$ is set at half clutch current level $I_{CR}$. After the steps S10, S11, and S12, the execution returns to the start to repeat the routine of FIG. 4.

The routine of FIG. 4 controls the clutch current command level $I_C$ to the minimal clutch current level $I_{CO}$ as shown in FIG. 3 when an abnormality occurs. This is performed as follows.

First, assume that the routine of FIG. 4 is executed immediately after the vehicle speed exceeds the predetermined level $V_0$. Further assume that the abnormal increase of the steering torque T is not developed. Then, after the affirmative judgment at step S3, the execution proceeds through step S7 to steps S8 and S9. The judgments at steps S8 and S9 are both negative. At step S10, the judgement is affirmative ($I_C > I_{CR}$), and the execution proceeds to step S11, where the clutch current command level $I_C$ is set at the half clutch current level $I_{CR}$. The clutch current command level $I_C$ is retained at the constant level $I_C = I_{CR}$ so long as the vehicle speed V is above the predetermined vehicle speed $V_0$ and the abnormality does not occur.

Assume further that at time point $t_1$, the steering torque T rises above the first predetermined steering torque $T_1$ ($T \geq T_1$). Then, when the routine of FIG. 4 is executed, the execution proceeds to step S8, where the judgement is affirmative. Thus, the execution proceeds to step S12, where the clutch current command level $I_C$ is set at the minimal clutch current level $I_{CO}$. As shown in FIG. 3, the clutch current command level $I_C$ remains at minimal clutch current level $I_{CO}$ even when the steering torque T falls below the first predetermined steering torque $T_1$, if the steering torque T is above the second steering torque $T_2$.

When the steering torque T finally falls below the second predetermined steering torque $T_2$ ($T < T_2$) at time point $t_2$, the execution proceeds to step S9 since the judgement at step S8 is negative. The judgement at step S9 is affirmative, and the execution proceeds to step S11, where the clutch current command level $I_C$ is returned to the half clutch current level $I_{CR}$.

Thus, since a hysteresis is provided for the reference torque level $T_2$ for returning the clutch current command level $I_C$ to the normal half clutch current level $I_{CR}$, the routine of FIG. 4 effectively prevents the hunting of the steering torque T and thus provides an improved reliability and safety.

In the case of the above embodiments, the commands to the electric motor 13 and the electromagnetic clutch 14 are the motor current command level $I_M$ and the clutch current command level $I_C$, respectively. However, levels of other electrical quantity, etc., corresponding to the electrical driving power thereof, such as the steering angular velocity or the voltage level may be used instead as the commands.

What is claimed is:

1. An electric power steering device for an automotive vehicle comprising:
   a steering system including a steering wheel;
   electric motor means for providing an assisting steering torque to said steering system;
   electromagnetic clutch means for selectively transmitting said assisting steering torque generated by said electric motor to said steering system;
   steering torque sensor means for detecting a steering torque applied upon said steering system;
   vehicle speed sensor means for detecting a speed of said vehicle;
   motor controller means, coupled to said steering torque sensor means and said vehicle speed sensor means, for generating a motor drive command level in accordance with said steering torque detected by said steering torque sensor means and said vehicle speed detected by said vehicle speed sensor means, said motor drive command level corresponding to a command level of said assisting steering torque generated by said electric motor means, wherein said motor controller means reduces said motor drive command level to zero when said vehicle speed is above a predetermined vehicle speed;
   clutch controller means, coupled to said steering torque sensor means and said vehicle speed sensor means, for generating a clutch drive command level in accordance with said steering torque detected by said steering torque sensor means and said vehicle speed detected by said vehicle speed sensor means, said clutch drive command level corresponding to a degree of engagement of said electromagnetic clutch means by which said assisting steering torque of said electric motor means is transmitted to said steering system, wherein said clutch controller means includes: (a) means for setting a first predetermined torque level for determining an occurrence of an abnormal level of said steering torque, and a second predetermined torque level smaller than said first predetermined torque level; (b) means for setting said clutch drive command level to a level corresponding to said vehicle speed detected by said vehicle speed sensor means when said vehicle speed detected by said vehicle speed sensor means is below a predetermined vehicle speed; (c) means for setting said clutch drive command level to a predetermined level when said vehicle speed detected by said vehicle speed sensor means is above said predetermined vehicle speed and said steering torque detected by said steering torque sensor means is below said first predetermined torque level; (d) means for setting said clutch drive command level to a predetermined minimal level smaller than said predetermined level set by said means (c), when said vehicle speed detected by said vehicle speed sensor means is above said predetermined vehicle speed and said steering torque detected by said steering torque sensor means rises above said first predetermined torque level; and (e) means for returning said clutch drive command level to said predetermined level set by said means (c), when said steering torque detected by said steering torque sensor means falls below said second predetermined torque level.

2. An electric power steering device as claimed in claim 1, wherein said means (b) of said clutch controller means decreases said clutch drive command level gradually to said level of said clutch drive command level set by said means (c), as said vehicle speed increases to said predetermined vehicle speed.

3. An electric power steering device as claimed in claim 1, wherein said motor drive command level is a motor current command level of said electric motor means.

4. An electric power steering device as claimed in claim 1, wherein said clutch drive command level is a clutch current command level of said electromagnetic clutch means.

5. A method for controlling an electric power steering system of an automotive vehicle including: a steering system including a steering wheel for receiving a steering torque applied by a driver; an electric motor for providing an assisting steering torque to said steering system; an electromagnetic clutch for transmitting said assisting steering torque of said electric motor to said steering system, wherein an amount of torque transmitted through said electromagnetic clutch corresponds to a clutch drive command level supplied thereto; said method comprising the steps of:
   (a) judging whether or not a speed of said vehicle is above a predetermined vehicle speed;
   (b) setting said clutch drive command level of said electromagnetic clutch to a predetermined level when said vehicle speed is below a predetermined vehicle speed;
   (c) judging whether or not a steering torque applied upon said steering system is above a first predetermined torque level indicating an occurrence of an abnormal torque level when said vehicle speed is above said predetermined vehicle speed;
   (d) judging, when said steering torque is below said first predetermined torque level, whether or not said steering torque is below a second predetermined torque level smaller than said first predetermined torque level;
   (e) setting said clutch drive command level to a predetermined command level smaller than said first level set at step (b), when said steering torque is below said second predetermined torque level; and
   (f) setting said clutch drive command level to a predetermined minimal command level smaller than said predetermined command level set at step (e), when said steering torque is above said first predetermined torque level.

* * * * *